United States Patent

[11] 3,593,258

[72] Inventor Clyde M. Slavens
 Houston, Tex.
[21] Appl. No. 850,537
[22] Filed Aug. 15, 1969
[45] Patented July 13, 1971
[73] Assignee Mandrel Industries, Inc.
 Houston, Tex.

[54] DUAL MAGNETIC CIRCUIT LOW LEAKAGE GEOPHONE
6 Claims, 2 Drawing Figs.

[52] U.S. Cl. .................................................. 340/17
[51] Int. Cl. .................................................. G01v 1/16
[50] Field of Search .......................................... 340/17

[56] References Cited
UNITED STATES PATENTS
3,100,292 8/1963 Warner, Jr. et al. ............ 340/17
3,412,376 11/1968 Johnson III ................. 340/17

Primary Examiner—Rodney D. Bennett, Jr.
Assistant Examiner—Brian L. Ribando
Attorney—Robert G. Clay ABSTRACT: A geophone for detecting seismic energy wherein a pair of cylindrical magnets are coaxially mounted within a hollow cylindrical, magnetically permeable housing with a first set of like polarity pole faces of the magnets in spaced apart confronting relationship centrally of the housing and the remaining like poles in flux communication with opposite enclosed ends of the housing to form an air gap extending from the confronting poles to the surrounding interior housing wall. A sensing coil of hollow cylindrical shape is mounted for coaxial and resilient reciprocation in the air gap region, and the flux emanating from each of the confronting pole faces is forced by the mutual repulsion between such like poles to assume a radial path effectively traversing the coil, thereby minimizing undesirable flux leakage and consequently increasing the electrical output from the coil.

PATENTED JUL 13 1971  3,593,258
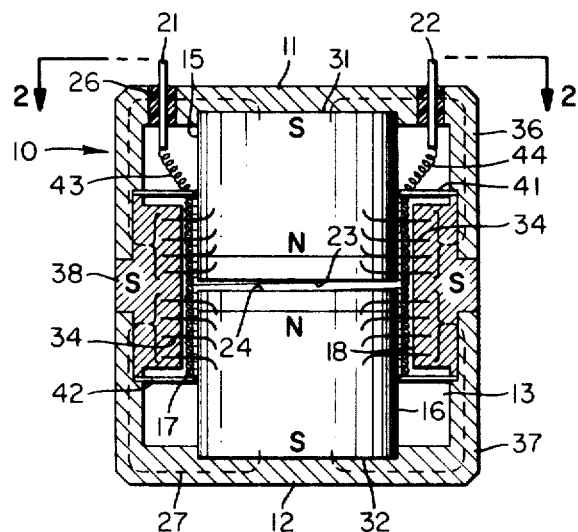
FIG_1
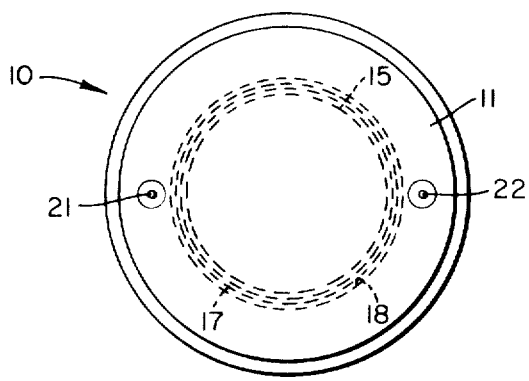
FIG_2
INVENTOR.
CLYDE M. SLAVENS
BY  *Robert S. Clay*
ATTORNEY

DUAL MAGNETIC CIRCUIT LOW LEAKAGE GEOPHONE

The present invention relates to electromagnetic sensing devices and more particularly to geophones or seismometers employed for geophysical prospecting.

In this sophisticated and modern method of prospecting, artificially generated seismic energy is introduced into the earth, and the seismic vibrations resulting therefrom are detected by a prearranged group or array of vibration sensitive instruments. Such instruments, known as geophones or seismometers, conventionally include a coil suspended for resilient reciprocation within a magnetic field. Relative vibration between the coil and the magnetic force lines in response to seismic vibrations induces a representative voltage in the coil, which voltage is communicated to recording and processing equipment through suitable connecting cables.

Exemplary instruments employed for this purpose are illustrated in U.S. Pat. No. 3,412,376 and U.S. Pat. No. 3,251,028, the latter of which has been assigned to the assignee of the present application. In each of these known devices, a cylindrical permanent magnet is disposed coaxially within a hollow cylindrical housing to establish annular air gaps of magnetic flux in the radial interspaces between these two components. One or more sensing coils are resiliently supported within these air gaps for coaxial reciprocation relative to the magnets and housing. While such instruments have proved satisfactory for their intended purpose, these and other devices have been known to exhibit slight to moderate flux leakage, i.e., magnetic flux which skirts rather than intercepts the sensing coil, thereby reducing the available voltage or electrical signal strength issued by the sensing coil in response to seismic vibrations. Consequently, larger and heavier structures have been required in order to boost the signal strength to a level which would theoretically be possible with a smaller instrument. In addition to increased structure size and mass, some instruments have been constructed with a plurality of air gaps and cooperating sensing coils which does provide an increase in the output signal. However, such units have the disadvantage of a lower overall efficiency due to the additional air gap and incur the practical disadvantage of a larger number of component parts.

While adequate signal strength is obviously a necessary feature of these instruments, equally significant consideration must also be given to the size and mass of each geophone unit due to the peculiar handling, transportation and environmental conditions to which these units are subjected. For example, the geophone must be of a sufficiently minimum size in order to be lowered into a small diameter seismic borehole. At the same time, the instrument must be rugged in order to resist damage to the sensitive portions of the device during handling and deployment. Suitable shielding of the sensing coil is also an important factor in order to avoid interference from external or earth originating magnetic fields.

Accordingly, one of the primary objects of the present invention is to provide such an instrument having an increased electrical output or sensitivity without necessitating a corresponding increase in the size and mass thereof.

It is the further object of the present invention to provide such a geophone instrument wherein the enhanced signal output is achieved without sacrificing instrument features which have become known as necessary or highly desirable in seismic detectors.

Still another object of the present invention is to provide such a geophone wherein the configuration of the magnetic field structure provides advantageous shielding of the internal instrument components against external magnetic fields.

These and other objects and advantages of the invention are achieved by a geophone generally comprising a hollow housing of magnetically permeable material; a pair of separate magnet members disposed within the housing and arranged with a first set of like poles in confronting relationship generally centrally of the housing and with the remaining set of like poles contiguous with opposing wall portions of the housing; and a sensing coil supported for resilient reciprocation in an air gap region of uniform flux concentration surrounding the confronting magnet poles. By virtue of the confronting relationship between like polarity portions of the magnet members, the combined flux emanating therefrom is forcefully directed in an outwardly extending flux path which necessarily intercepts or cuts through the surrounding sensing coil and thereafter exits into the surrounding internal wall portions of the housing. The air gap region within which the sensing coil is disposed, accordingly has an interior boundary defined by the circumferential magnet portions adjacent the confronting poles and an exterior boundary provided by the internal wall portions of the housing surrounding the confronting poles. Due to the configuration of the magnetic circuit thus provided, little if any magnetic flux is allowed to escape or skirt the windings of the sensing coil and accordingly maximum utilization of the magnetic energy is achieved for inducing a voltage on the coil in response to relative movement thereof. Additionally, in accordance with the preferred embodiment of the invention, the housing of magnetic material wholly surrounds the confronting like poles and sensing coil to achieve highly desirable shielding thereof from external or stray magnetic fields. If external fields are allowed to influence the sensing coil, it will be apparent that erroneous output signal levels would result.

The invention will be more fully understood and appreciated by referring to the following description of the preferred embodiment thereof, which description is to be taken in conjunction with the accompanying drawings, wherein:

FIG. 1 is an elevation view, partly in section, of the geophone constructed in accordance with the present invention; and FIG. 2 is an elevation view of the geophone as seen from arrows 2–2 of FIG. 1.

With reference to FIG. 1, the invention in its presently preferred form generally comprises an enclosed cylindrical housing 10 formed of a suitably permeable magnetic material and having enclosed ends 11 and 12 defining an internal chamber 13; a pair of similar cylindrical permanent magnets 15 and 16 coaxially disposed in chamber 13 with a first pair of like polarity poles in spaced apart confronting relationship and with the remaining pair of like poles affixed to opposing ends 11 and 12 of housing 10; and a sensing coil 17 having a hollow cylindrical form and being suspended coaxially in the annular region between magnets 15 and 16 and an internal cylindrical wall 18 of housing 10 adjacent to the confronting magnet poles. The cylindrical form of housing 10 adapts the instrument for coaxial disposition or lowering thereof within a small diameter seismic borehole. With the geophone properly in place at a desired depth below the ground surface, artificially induced or naturally occurring seismic energy is detected by reason of resulting vibratory movement of coil 17 relative to the field provided by magnets 15 and 16 and housing 10 which in turn produces a varying voltage across coil terminals 21 and 22.

As the strength or magnitude of this voltage signal is dependent on the amount of magnetic flux which the coil cuts across during induced movement or vibration thereof, the present invention provides in the arrangement of housing 10 and magnets 15 and 16 a magnetic circuit which maximizes the number of flux lines intercepted by the sensing coil thus achieving a greater degree of efficiency between the output voltage signal and the amount of magnetic energy stored by the magnets. The latter parameter is a function of the size and mass of the magnetic components employed, and accordingly by virtue of the above noted increased efficiency, it is possible to produce a more compact and lighter weight instrument while at the same time maintaining the sensitivity thereof. Furthermore, as described herein the configuration of the magnetic circuit is such that a symmetrical flux density gradient is achieved in the air gap region so as to minimize distortion in the output signal.

As shown in FIG. 1, by arranging magnets 15 and 16 with a pair of like pole faces 23 and 24 in confronting and proximately spaced apart relationship, a pair of separate flux paths 26 and 27 are realized. Moreover, in the region of the air gap within which coil 17 is disposed, the flux lines of each of paths 26 and 27 undergo mutual opposition by virtue of the like polarity confronting poles. Thus, essentially all of the flux emanating from pole faces 23 and 24 is forced radially outwardly into cutting relationship with coil 17. Upon outward radial traverse of the annular air gap, the flux lines communicate with internal cylindrical wall 18 of housing 10 and are thereupon returned to the remote like polarity pole faces 31 and 32 via paths 26 and 27. Whereas in the absence of this field shaping feature provided by the arrangement of magnets 15 and 16, the flux lines would emanate and terminate at the axial end portions of pole faces 23 and 24, it will be apparent that the mutual opposition of the like polarity poles forces at least some of the field lines to emerge from or terminate into the adjacent circumferential edge portions of the magnets. This effect is diagrammatically illustrated by flux lines 34 in FIG. 1.

Also, by virtue of this mutual opposition or repulsion of the field lines, a desirable axial symmetry is achieved in the flux density gradient relative to coil 17. In the absence of such symmetry, there is a tendency of the induced coil voltage to be differentially dependent on the axial direction of coil movement, thereby resulting in distortion of the output signal. It will be appreciated that in the present invention, the flux density gradient is such that sensing coil 17 is subject to the same proportion of magnetic flux regardless of the direction of axial movement. Thus, a higher degree of analog fidelity is achieved between the vibration stimulus and the output voltage signal.

In addition to providing means for completing the flux paths 26 and 27, housing 10 advantageously serves to isolate or shield coil 17 from external magnetic fields such as those naturally occurring in the earth. As housing 10 wholly surrounds the sensing portion of the instrument and is of a highly permeable material, a barrier is formed against these external magnetic fields.

For reasons of facilitating construction and assembly of the instrument and in order to further improve the efficient utilization of magnetic flux, housing 10 is formed of a pair of identical cup shaped cylindrical members 36 and 37 which are matingly joined at their open ends by an annular pole piece 38. Pole piece 38 is provided with a portion projecting radially inwardly from the adjacent internal walls of housing members 36 and 37 which portion defines internal cylindrical wall 18. Preferably, the axial dimension of wall 18 of pole piece 38 is coextensive with the corresponding dimension of sensing coil 17 and of greater axial dimension than the spacing between pole faces 23 and 24. Thus, pole piece 38 by its inwardly projecting wall 18 provides a path of least resistance to the magnetic field lines from the confronting pole faces wherein such path is in flux cutting relationship with the coil. Furthermore, by selecting the relative dimensions of pole piece 38 and the spacing between magnet pole faces 23 and 24 such that internal wall 18 bridges this spacing, the flux lines 34 associated with the outer circumferential edge portions of the magnets are properly directed into cutting relationship with the sensing coil.

Coil 17 is formed and resiliently suspended within the housing by appropriate means well known to those skilled in the art. The suspension means should be such as to allow adequate axial and resilient reciprocation of coil 17 relative to housing 10, wherein such means are here diagrammatically illustrated as annular spring elements 41 and 42. These elements may take the form of the annular spring suspension members shown in U.S. Pat. No. 3,251,028 or as shown in U.S. Pat. No. 3,412,376 for example. The electrical connections to coil 17 should likewise allow the desired resilient reciprocation of the coil and in this instance coiled conductive leads 43 and 44 are employed between sensing coil 17 and terminals 21 and 22. Apertures 46 and 47 formed in end housing wall 11 served to insulatingly pass terminals 21 and 22 therethrough for connection to an external cable (not shown).

What I claim is:

1. A transducer for converting seismic vibrations into electrical energy, comprising;
   a housing formed of a magnetically permeable material and having a substantially enclosed internal chamber,
   a pair of magnets having a first pair of like poles separately affixed to spaced-apart portions of the interior wall of said housing chamber and a second pair of like poles disposed in proximate and confronting relationship and in spaced-apart adjacency with the interior walls of said chamber to define a free space region of magnetic field therebetween, and
   coil means resiliently supported in said region in flux cutting relationship with the field.

2. The transducer as defined in claim 1, wherein said housing is of cylindrical form having enclosed ends, said magnets are of annular form and the first pair of like poles are individually coaxially affixed to the interior walls of opposite ends of said housing and the second pair of said like poles are disposed generally centrally of said chamber, and said coil means comprising an annular winding coaxially mounted with and between said magnets and housing for axial reciprocation relative thereto.

3. The transducer as defined in claim 2, wherein said housing comprises an annular pole piece disposed circumferentially adjacent the second pair of like poles and projecting radially inwardly from portions of the interior housing wall adjacent the axial ends of said chamber to define an annular section of minimum radial separation between said magnets and said housing.

4. The transducer as defined in claim 3, wherein said magnets are of cylindrical form and said housing pole piece is formed with a internal cylindrical wall radially surrounding and axially bridging the second pair of like poles and said winding being of hollow cylindrical configuration and coaxially nested between said pole piece wall and the radially outer walls of said magnets.

5. The transducer as defined in claim 4, wherein said pole piece wall and said winding are substantially axially coextensive.

6. The transducer as defined in claim 4, wherein said winding has an axial dimension substantially equal to that of said pole piece wall and spring means mounted between each axial end of said winding and said housing to provide resilient axial reciprocation therebetween.